US010656887B2

(12) United States Patent
Nishiyama

(10) Patent No.: US 10,656,887 B2
(45) Date of Patent: May 19, 2020

(54) IMAGE PROCESSING APPARATUS AND METHOD FOR CONTROLLING IMAGE PROCESSING APPARATUS

(71) Applicant: CANON KABUSHIKI KAISHA, Tokyo (JP)

(72) Inventor: Kaori Nishiyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/241,753

(22) Filed: Jan. 7, 2019

(65) Prior Publication Data
US 2019/0243588 A1 Aug. 8, 2019

(30) Foreign Application Priority Data
Feb. 2, 2018 (JP) ................................. 2018-017493

(51) Int. Cl.
*G06F 3/12* (2006.01)
*H04N 1/00* (2006.01)

(52) U.S. Cl.
CPC .......... *G06F 3/1238* (2013.01); *G06F 3/1203* (2013.01); *G06F 3/1204* (2013.01); *G06F 3/1259* (2013.01); *G06F 3/1274* (2013.01); *G06F 3/1285* (2013.01); *H04N 1/0035* (2013.01)

(58) Field of Classification Search
None
See application file for complete search history.

(56) References Cited

U.S. PATENT DOCUMENTS

| 8,081,334 | B2* | 12/2011 | Yoshioka | ........... G03G 15/5012 358/1.13 |
| 2013/0308156 | A1* | 11/2013 | Kakutani | ........... G06K 15/4095 358/1.14 |
| 2016/0011835 | A1* | 1/2016 | Igarashi | ................ G06F 3/1292 358/1.15 |

FOREIGN PATENT DOCUMENTS

JP 8-6745 A 1/1996

* cited by examiner

*Primary Examiner* — Dov Popovici
(74) *Attorney, Agent, or Firm* — Canon U.S.A., Inc. IP Division

(57) ABSTRACT

An image processing apparatus includes a user authentication unit configured to authenticate a user that logs in to the image processing apparatus and manage user identification information of the authenticated user. The image processing apparatus displays, on a display unit, only a job in which a job execution user ID is coincident with the user identification information of the login user when a suspension request for a print job is received, and makes a selected job cancelable.

12 Claims, 19 Drawing Sheets

FIG.9

| JOB ID | JOB EXECUTION USER ID | JOB NAME | RECEPTION DATE | STATUS |
|---|---|---|---|---|
| 0000 | user_00 | MEETING MATERIAL.doc | 2017/5/30 9:25:00 | UNDER EXECUTION |
| 0001 | user_01 | SUBMISSION MATERIAL.xls | 2017/5/30 9:25:30 | STAND-BY |
| 0002 | user_00 | MEETING SUPPLEMENT MATERIAL.doc | 2017/5/30 9:27:00 | STAND-BY |
| 0003 | user_02 | SUPPLEMENT MATERIAL.xls | 2017/5/30 9:27:10 | STAND-BY |
| 0004 | user_01 | SUPPLEMENT MATERIAL.xls | 2017/5/30 9:28:30 | STAND-BY |

FIG.18

| PRIORITY | JOB TYPE |
|----------|----------|
| 1 | SEND |
| 2 | PRINT |
| 3 | COPY |
| 4 | RECEPTION |

IMAGE PROCESSING APPARATUS AND METHOD FOR CONTROLLING IMAGE PROCESSING APPARATUS

BACKGROUND

Field of the Disclosure

The present disclosure relates to display when job suspension control is performed in an image processing apparatus.

Description of the Related Art

An image processing apparatus, such as a digital multifunctional peripheral, is known as a job processing apparatus including a plurality of processing functions. The digital multifunctional peripheral includes processing functions of, for example, copying, printing, scanning, electronic mail sending, and fax sending and receiving. Further, the digital multifunctional peripheral can execute processing functions of, for example, storing digital data in a storage device and calling the digital data from the storage device.

A plurality of jobs can be input to the above-described image processing apparatus; however, in a case where a user erroneously inputs a job, it is difficult for the user to immediately select and stop the job from a job list that includes jobs by other users in some cases.

In a case where the image processing apparatus receives a print suspension request from a user, the known image processing apparatus suspends all jobs in response to the print suspension request, receives selection of a job to be canceled to perform a cancel operation on the selected job, and then resumes other jobs (Japanese Patent Application Laid-Open No. 8-6745). Such an image processing apparatus first suspends all jobs, which is convenience to urgently suspend the job.

In the above-described image processing apparatus, however, when the job suspension is requested from the user, all of the jobs including jobs by users other than the user who wants to cancel a job are suspended. A list of the suspended jobs includes all of the jobs by users other than the user who has requested the suspension. Accordingly, legibility is deteriorated when the login user looks for the job to be canceled, and the login user may erroneously cancel a job by another user.

SUMMARY

According to an aspect of some embodiments, an image processing apparatus including an image forming unit configured to print an image on a sheet, includes an acquisition unit configured to acquire user identification information about a user logged in to the image processing apparatus, a storage unit configured to store a job and a user who has input the job in association with each other, a suspension unit configured to suspend a job in which image formation is being executed by the image forming unit, in response to suspension operation by a user, a display unit configured to display a job list screen, and a cancel unit configured to cancel a job selected in the job list screen. The display unit displays, on the job list screen, a job list stored in association with the user corresponding to the user identification information acquired by the acquisition unit.

Further features of various embodiments will become apparent from the following description of exemplary embodiments with reference to the attached drawings.

BRIEF DESCRIPTION OF THE DRAWINGS

FIG. 9 is a diagram illustrating a print job queue in the image processing apparatus.

FIG. 18 illustrates an example of user operation environment information.

DESCRIPTION OF THE EMBODIMENTS

An example of an image processing apparatus that is a job processing apparatus according to an exemplary embodiment will be described below with reference to drawings.

Figure 1:
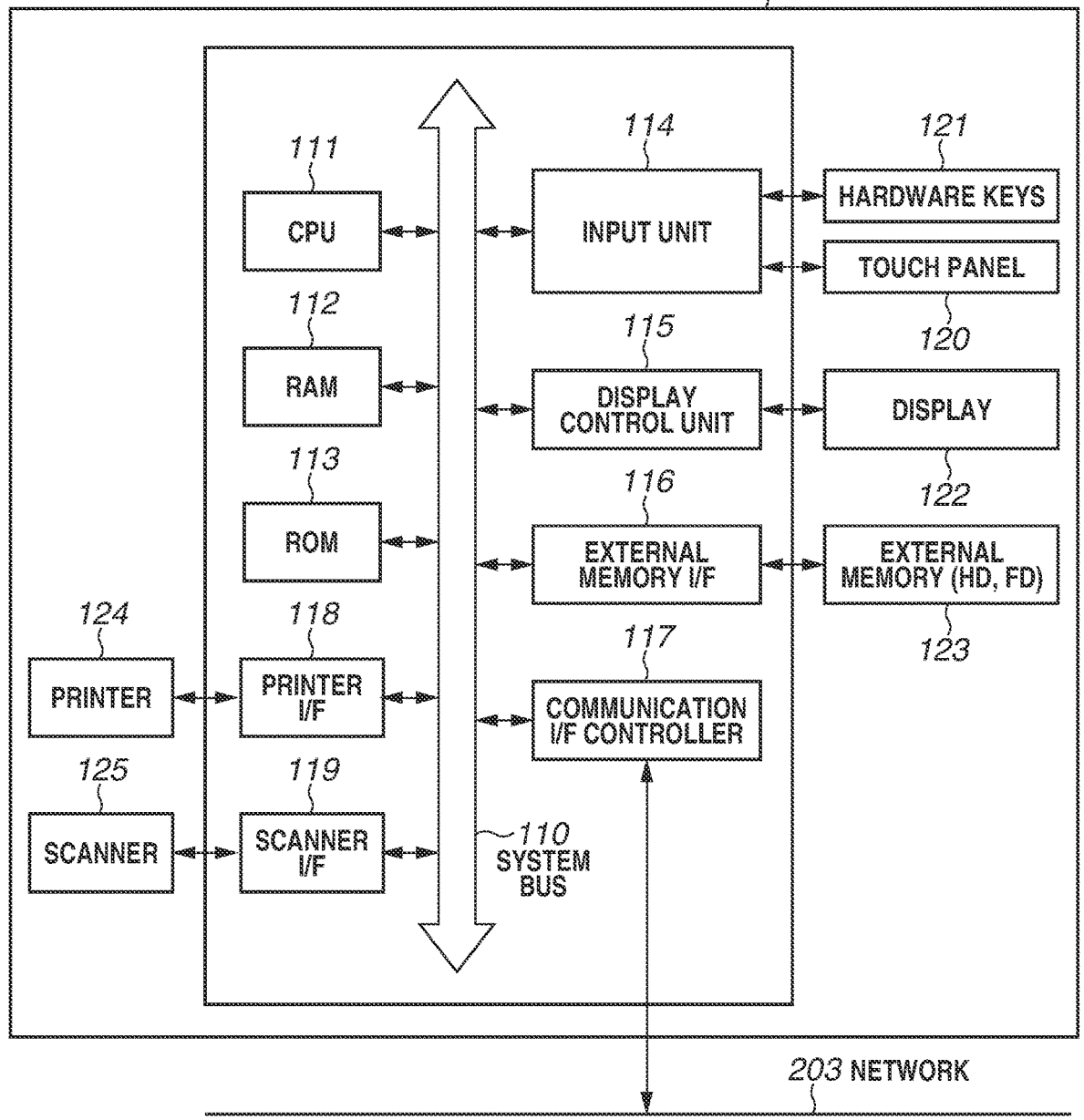
FIG. 1 is a block diagram illustrating a hardware configuration of an image processing apparatus according to an exemplary embodiment.

FIG. 1 is a block diagram illustrating a hardware configuration of an image processing apparatus 100 that is a job processing apparatus according to a first exemplary embodiment.

In FIG. 1, a central processing unit (CPU) 111, a random access memory (RAM) 112, a read-only memory (ROM) 113, an input unit 114, a display control unit 115, an external memory interface (I/F) 116, a communication I/F controller 117, a printer I/F 118, and a scanner I/F 119 are connected to a system bus 110. Further, a touch panel 120, hardware keys 121, a display 122, an external memory 123, a printer 124, and a scanner 125 are connected to the corresponding units. The units connected to the system bus 110 are configured so as to exchange data via the system bus 110.

The ROM 113 is a nonvolatile memory. Image data, other data, various kinds of programs for operation of the CPU 111, etc., are stored in respective predetermined regions of the ROM 113.

The RAM 112 is a volatile memory and is used as a temporary storage area, such as a main memory and a work area of the CPU 111.

The CPU 111 uses the RAM 112 as the work area to control the units of the image processing apparatus 100 based on, for example, the programs stored in the ROM 113. The programs for operation of the CPU 111 may be previously stored in the external memory (such as a hard disk) 123 without limitation to the ROM 113.

The input unit 114 receives a user operation, generates a control signal corresponding to the operation, and supplies the control signal to the CPU 111. The input unit 114 is connected to the touch panel 120 and the hardware keys 121 as input devices receiving the user operation. The touch panel 120 is an input device configured to output coordinate information corresponding to a touched position on an input unit that is formed as a flat surface. A touch panel of any of a resistive film type, an electrostatic capacitance type, a surface acoustic wave type, an infrared type, an electromagnetic induction type, an image recognition type, an optical sensor type, and the like may be used.

The hardware keys 121 are the input devices that are physically pressed, and include numeric keys, a start key, and a stop key. The CPU 111 controls the units of the image processing apparatus 100 according to the programs, based on the control signal that is generated by and supplied from the input unit 114 in response to the user operation performed with respect to the input devices. This causes the image processing apparatus 100 to perform an operation corresponding to the user operation.

The display control unit 115 outputs a display signal to display an image to the display 122. More specifically, the CPU 111 supplies a display control signal that has been generated according to the program to the display control unit 115, and the display control unit 115 generates the display signal based on the display control signal and outputs the display signal to the display 122. For example, the display control unit 115 displays, on the display 122, a graphical user interface (GUI) screen configuring GUI, based on the display control signal generated by the CPU 111.

The touch panel 120 is integrally configured with the display 122. For example, the touch panel 120 is configured such that optical transmittance does not inhibit display of the display 122, and is attached to an upper layer of a display surface of the display 122. Further, an input coordinate on the touch panel 120 is associated with a display coordinate on the display 122. This makes it possible to configure the GUI to operate as if the user can directly operate a screen displayed on the display 122.

The external memory 123, such as a hard disk (HD), a floppy disk (FD), a compact disk (CD), a digital versatile disk (DVD), and a memory card, is mountable on the external memory I/F 116. The external memory I/F 116 reads data from the mounted external memory 123 or writes data into the external memory 123 under control of the CPU 111.

The communication I/F controller 117 performs communication with various kinds of networks 203, such as local area networks (LAN), the Internet, wired networks, and wireless networks, under control of the CPU 111. The scanner I/F 119 controls image input from the scanner 125. The printer I/F 118 controls image output to the printer 124.

<Network Configuration>

Figure 2:
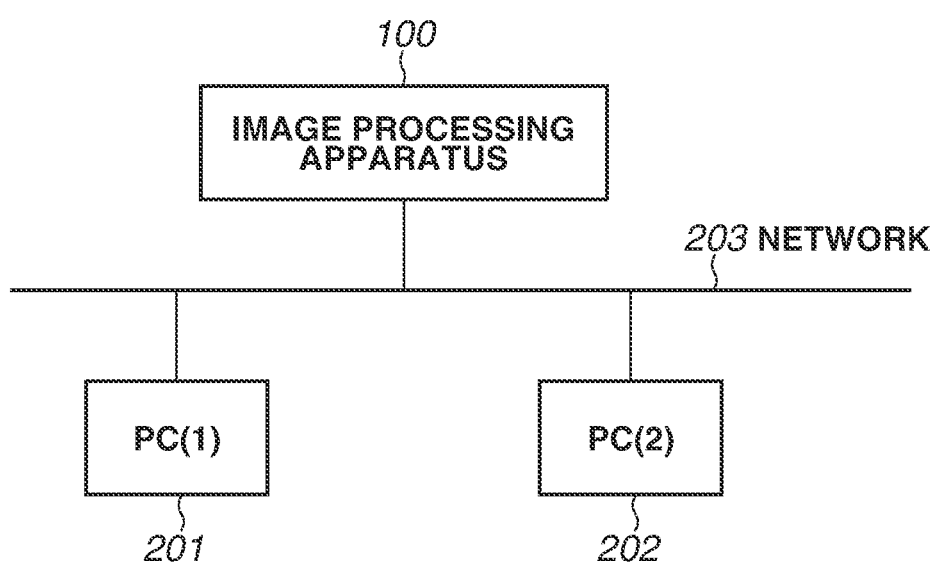
FIG. 2 is a block diagram illustrating a network configuration of a system in which the image processing apparatus operates.

FIG. 2 illustrates a configuration of a network system to which the image processing apparatus 100 is connected.

Personal computers PC(1) 201 and PC(2) 202 are connected to the image processing apparatus 100 via the network 203. The PC(1) 201 is a user authentication server apparatus, and the PC(2) 202 is a user terminal that the user can use to input a print job. In FIG. 2, two PCs, PC(1) 201 and PC(2) 202, are illustrated; however, more PCs may be connected to the network 203.

Figure 3:
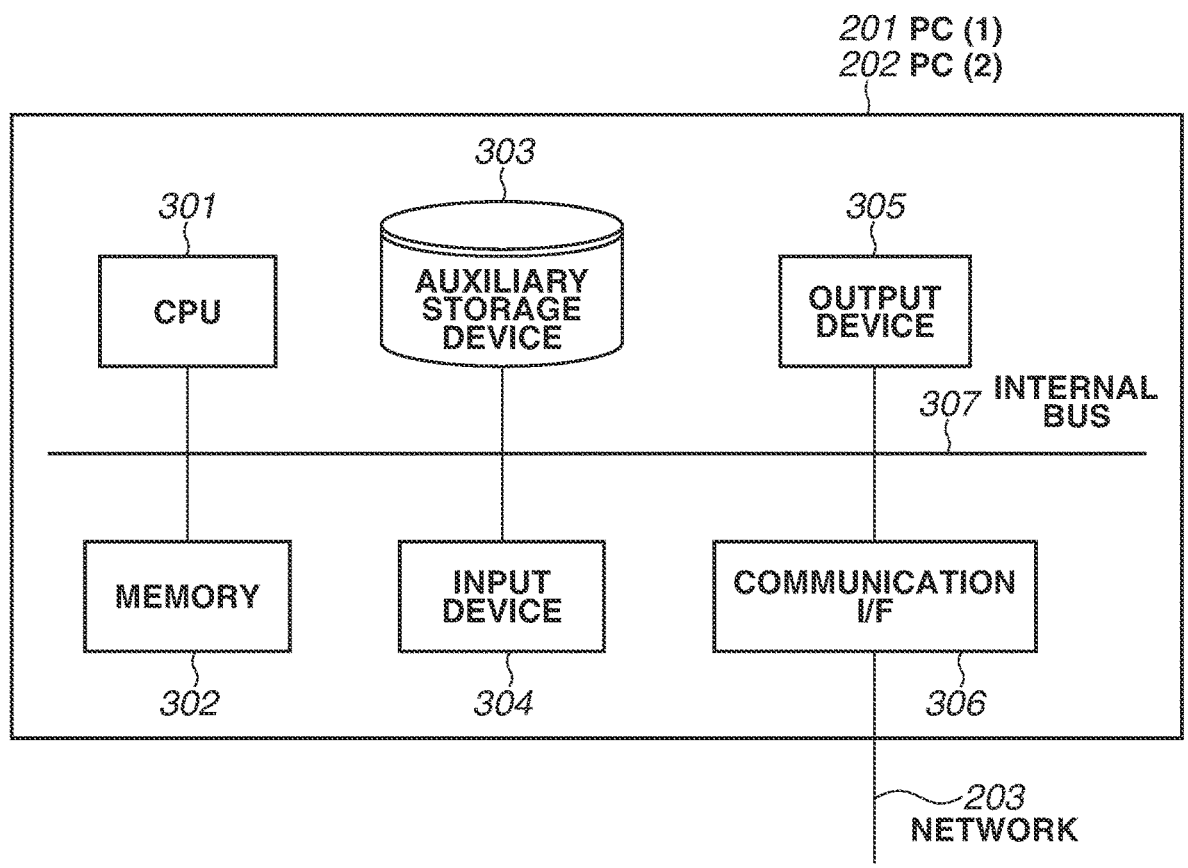
FIG. 3 is a block diagram illustrating a hardware configuration of a personal computer (PC) configuring the system.

FIG. 3 is a block diagram illustrating a hardware configuration of each of the PC(1) 201 and the PC(2) 202 illustrated in FIG. 2. The hardware configurations of the PC(1) 201 and the PC(2) 202 are the same. Therefore, description will be given focusing on the hardware configuration of the PC(1) 201.

The PC(1) 201 includes a CPU 301, a memory 302, an auxiliary storage device 303, an input device 304, an output device 305, and a communication I/F 306 that are connected with one another via an internal bus 307.

The CPU 301 controls the entire PC(1) 201. The memory 302 includes a RAM and a ROM, and programs and various kinds of data are stored in the memory 302. The auxiliary storage device 303 is a large-capacity storage device, such as a hard disk, and large-capacity data and execution code of a program are stored in the auxiliary storage device 303. For example, data required to be stored for a long term may be stored in the auxiliary storage device 303 instead of the memory 302.

The input device 304 includes a keyboard and a pointing device. The user uses the input device 304 to input various kinds of instructions to the PC(1) 201.

The output device 305 is, for example, a display, and the processing executed by the CPU 301 is displayed on the output device 305. The communication interface 306 performs transmission/reception of digital data via the network 203.

<Processing Function of Image Processing Apparatus>

Figure 4:
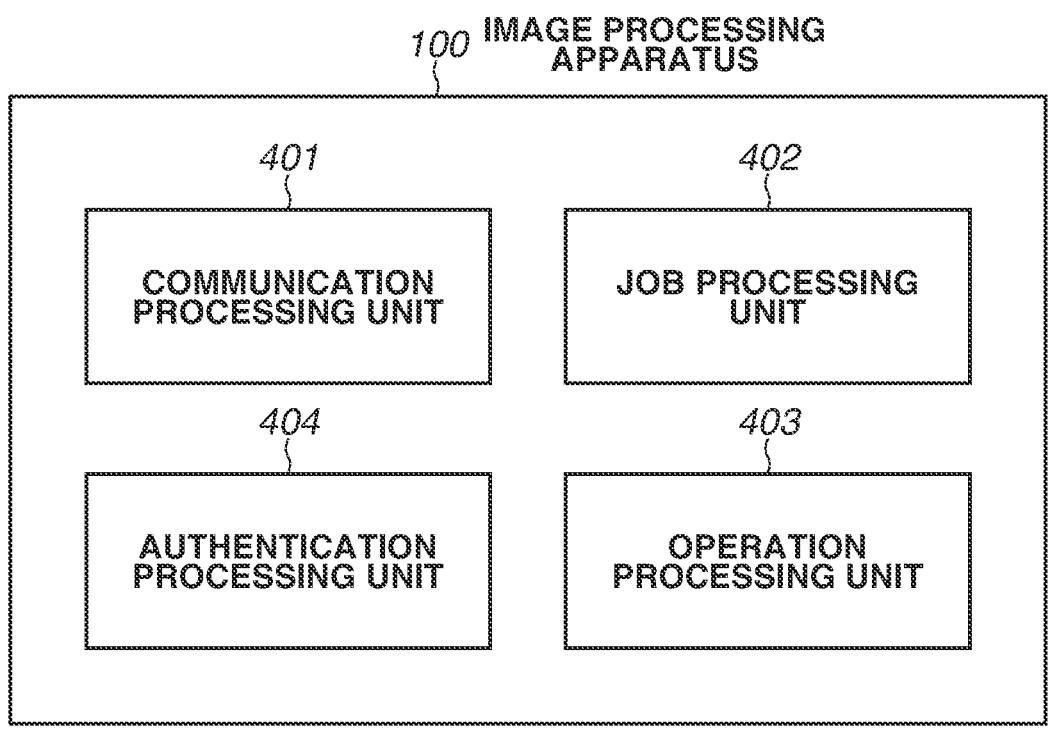
FIG. 4 is a diagram illustrating a system configuration in a controller of the image processing apparatus.

FIG. 4 is a block diagram illustrating functions of the image processing apparatus 100 illustrated in FIG. 1. The image processing apparatus 100 includes, as the functions, a communication processing unit 401, a job processing unit 402, an operation processing unit 403, and an authentication processing unit 404. These function units correspond to the functions that are realized when the CPU 111 reads programs stored in the ROM 113 or the external memory 123 to the RAM 112 and executes the read programs.

The communication processing unit 401 executes analysis of a communication command and communication control. The communication command is transmitted to and received from the PC(1) 201, the PC(2) 202, etc., connected to the network 203 via the communication I/F controller 117. The job processing unit 402 performs processing of various kinds of jobs executed by the image processing apparatus 100. More specifically, the job processing unit 402 controls the printer 124 to execute a print job, controls the scanner 125 to execute a scan job, and controls the communication I/F controller 117 to execute a transmission job. Further, the job processing unit 402 performs suspension processing and cancel processing of the above-described various kinds of jobs.

The operation processing unit 403 controls the display control unit 115 to display various kinds of information of a user on the display 122. Further, the operation processing unit 403 receives, via the input unit 114, the operation instruction from the user input using the hardware keys 121 and the touch panel 120, and performs processing corresponding to the instruction.

The authentication processing unit 404 receives login/logout request from the user, communicates with the PC(1) 201 serving as the user authentication server to perform authentication, and manages the user who uses the image processing apparatus 100.

<User Authentication Server: PC(1)>

Figure 5:
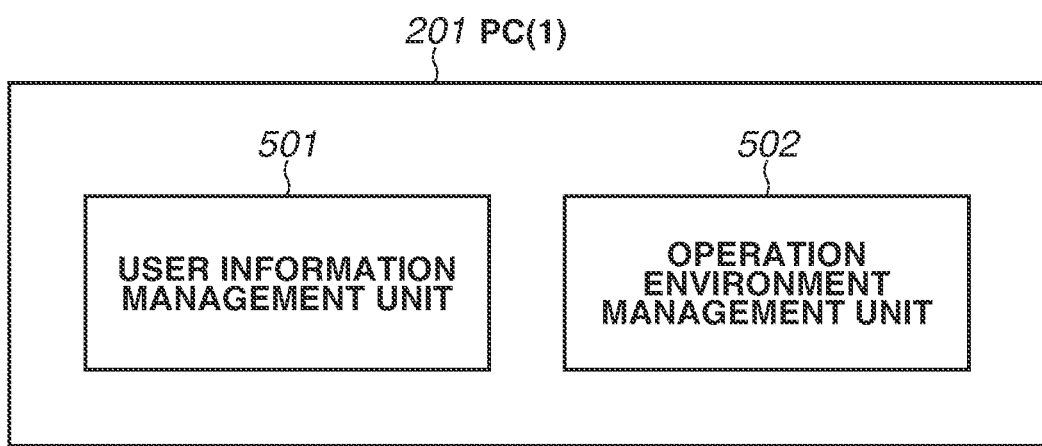
FIG. 5 is a diagram illustrating a system configuration of a user authentication server.

FIG. 5 is a block diagram illustrating an example of the functions of the PC(1) 201 serving as the user authentication server illustrated in FIG. 2.

The PC(1) 201 described with reference to FIG. 3 serves as the user authentication server, and the PC(1) 201 holds user information for authentication of a user, such as a login user identification (ID) and a password. The user authentication server includes a user information management unit 501 and an operation environment management unit 502.

The user information management unit 501 manages the user information that includes the user identification information (user ID) and is inquired by a terminal (other PC(2) 202 or image processing apparatus 100) connected to the network 203 via the communication I/F 306.

The operation environment management unit 502 manages the operation environment for each user managed by the user information management unit 501. The operation environment management unit 502 manages, as the operation environment, for example, information for customization of the operation screen displayed on the display 122 for each user. When the user logs in to the image processing apparatus 100, the operation screen is displayed on the display 122 based on the operation environment information about the user, which makes it possible to provide an operation screen that is convenient for the user.

In the present exemplary embodiment, information about a priority of the jobs displayed in a job list is managed. FIG. 18 illustrates an example of the priority of the jobs held as the operation environment information. Processing using the operation environment information will be described in detail in a second exemplary embodiment.

In this example, the PC(1) 201 serving as the user authentication server includes the user information management unit 501 and the operation environment management unit 502. Alternatively, at least one of the user information management unit 501 and the operation environment management unit 502 may be provided in the image processing apparatus 100.

<Print Job Input Processing>

Figure 7:
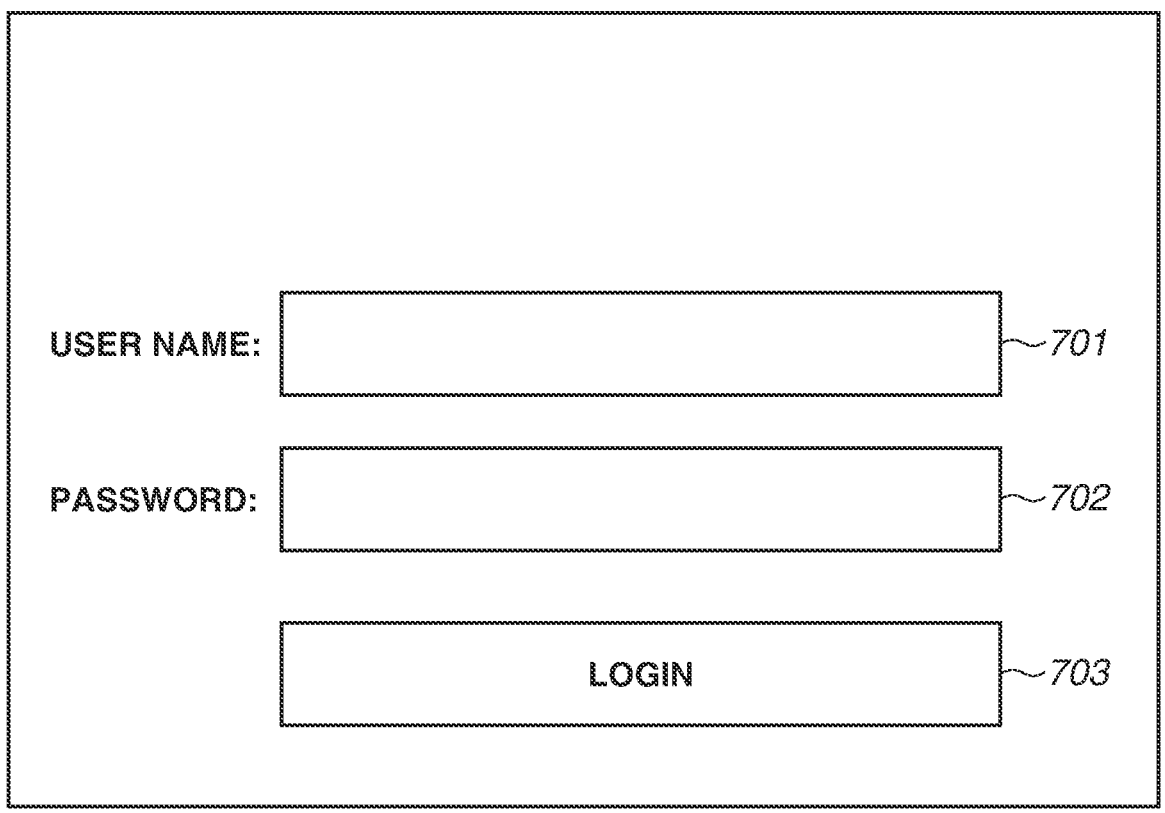
FIG. 7 illustrates an example of a login screen displayed on a display of the image processing apparatus.
Figure 8:
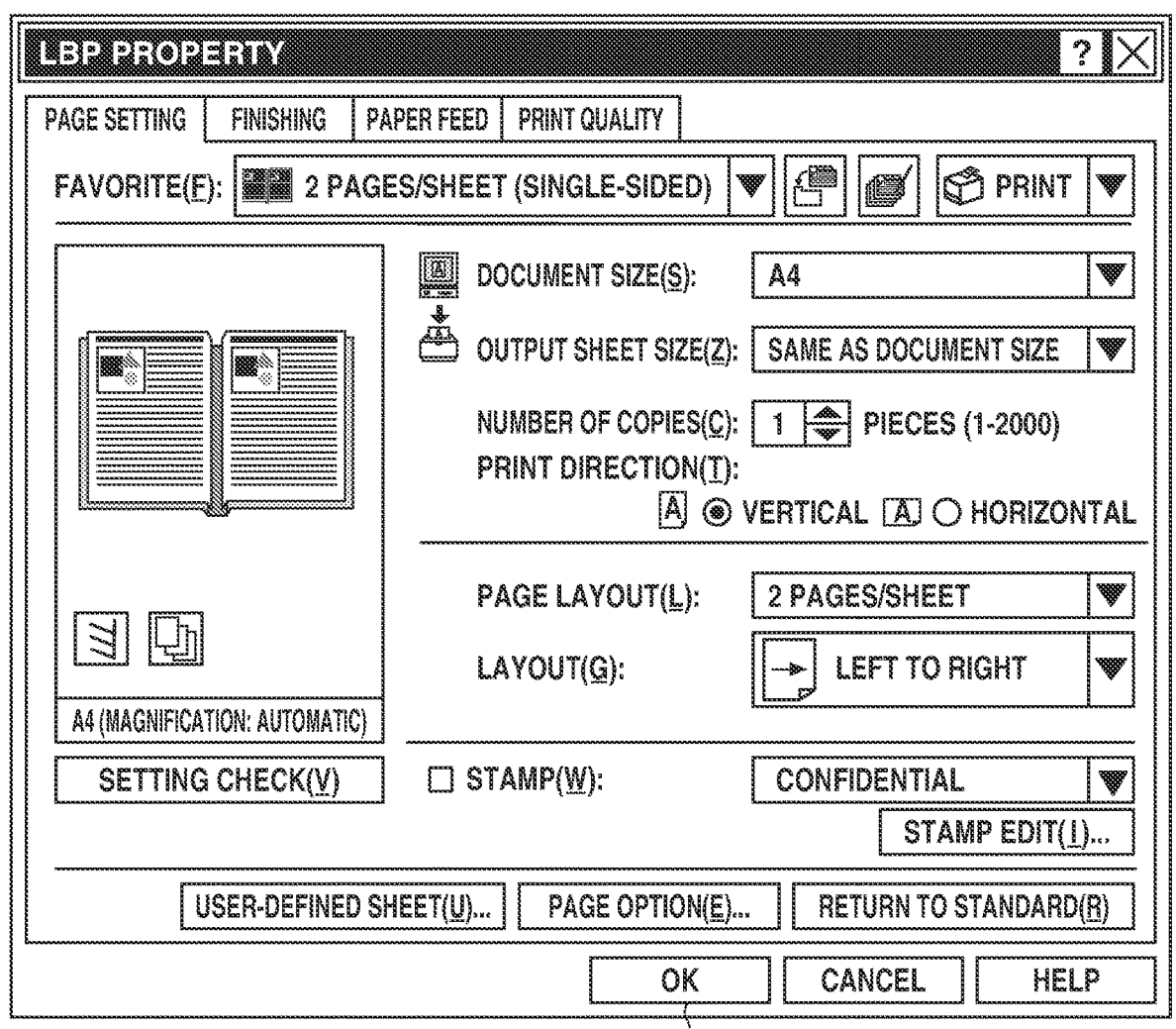
FIG. 8 illustrates an example of a print setting screen displayed on a display of the PC.

Next, a flow after the user inputs a print job in the PC(2) 202 serving as the user terminal until the user presses the stop key will be described with reference to a flowchart of FIG. 6 and screens illustrated in FIG. 7 and FIG. 8.

Figure 6:
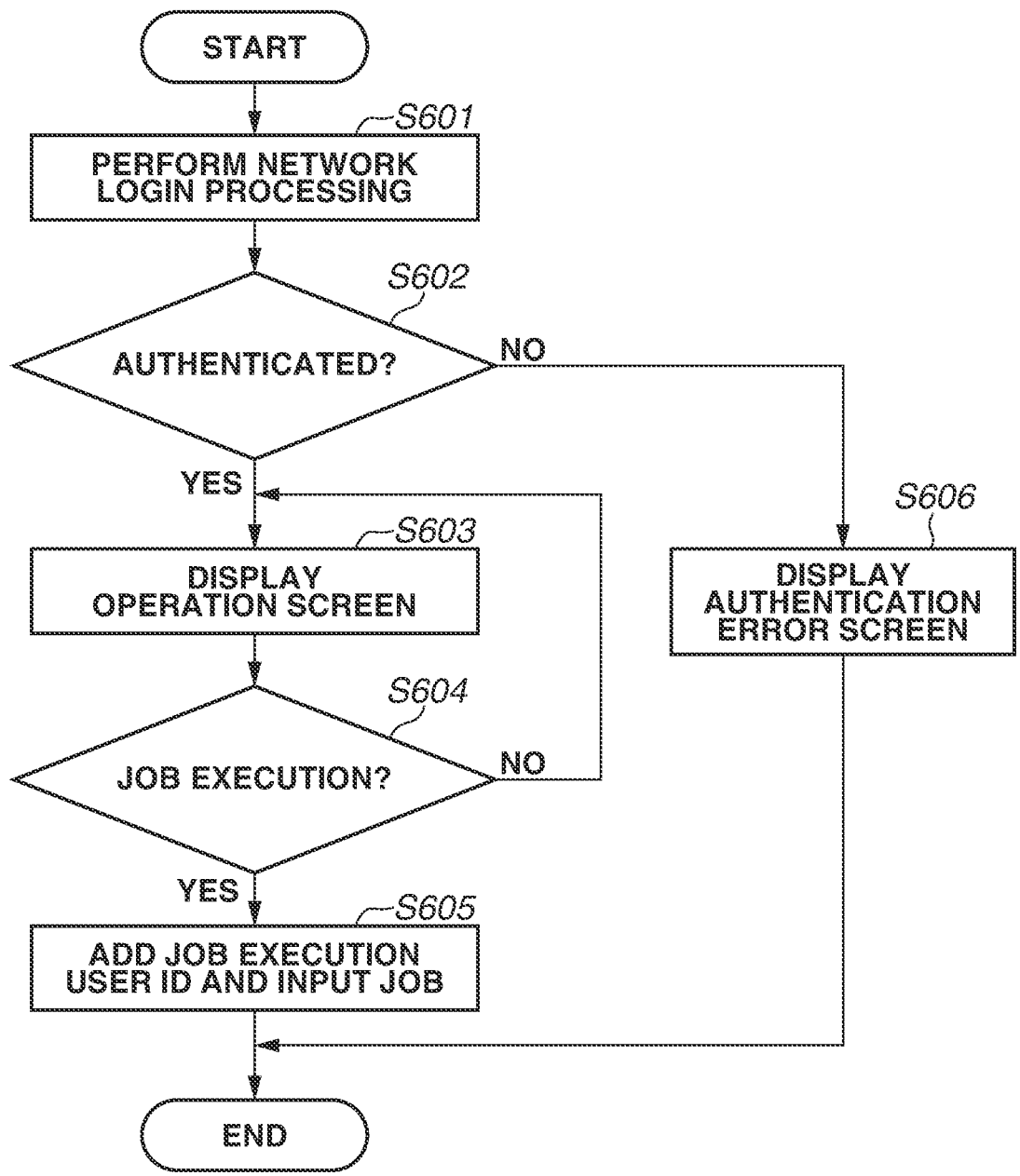
FIG. 6 is a flowchart illustrating a flow of processing by the PC from authentication to job input to the image processing apparatus.

FIG. 6 is a flowchart illustrating processing when the user inputs a print job from the PC(2) 202 serving as the user terminal illustrated in FIG. 2 to the image processing apparatus 100.

To input the print job from the PC(2) serving as the user terminal to the image processing apparatus 100, login processing is first performed in the PC(2) 202 in step S601. FIG. 7 illustrates an example of a login screen displayed on the output device 305 of the PC(2) 202. The user enters the login user ID in a user name entry field 701 and the password in a password entry field 702 using the input device 304, and then presses a "login" button 703 to perform a login request. In response thereto, the CPU 301 transmits the user information to the PC(1) 201 serving as the user authentication server via the communication IF 306. In the PC(1) 201 serving as the user authentication server, the CPU 301 performs user authentication based on the user information and transmits user authentication information indicating a result of the authentication to the PC(2) 202 serving as the user terminal. The user information may be entered with the use of, for example, an authentication device for an integrated circuit (IC) card or a biometric authentication device for a fingerprint and a vein, in addition to the method using the input device 304.

In step S602, in the PC(2) 202 serving as the user terminal, the CPU 301 checks whether authentication has been obtained from the PC(1) 201 serving as the user authentication server, based on the user authentication information. If the authentication has not been obtained (NO in step S602), the CPU 301 displays an authentication error screen on the output device 305 in step S606, and the processing ends.

In contrast, if the authentication has been obtained (YES in step S602), the CPU 301 displays an operation screen (terminal operation display screen) on the output device 305 in step S603.

Subsequently, in step S604, the CPU 301 monitors whether the user performs a predetermined operation in the operation screen to instruct the execution of a print job. FIG. 8 illustrates an example of a print setting screen by a driver software, displayed on the output device 305 of the PC(2) 202. The user enters one or more settings necessary for printing using the input device 304 and instructs execution of the print job. In FIG. 8, an "OK" button 801 corresponds to the instruction of the job execution.

If the execution of the print job is instructed (YES in step S604), the CPU 301 adds a job execution user ID to the print job in step S605. In addition, the PC(2) 202 inputs the print job to the image processing apparatus 100, namely, the PC(2) 202 transmits print data to the image processing apparatus 100. The processing then ends. The image processing apparatus 100 that has received the print job executes print processing (print job) based on the received print data. If the execution of the print job is not instructed (NO in step S604), the processing returns to step S603, and the CPU 301 waits while displaying the operation screen.

<Operation of Image Processing Apparatus>

Next, the operation of the image processing apparatus 100 that has received the print job transmitted from the PC(2) 202 serving as the user terminal through the processing illustrated in FIG. 6 will be described. When the print job is transmitted to the image processing apparatus 100 from the PC(2) 202 serving as the user terminal, or the like, the CPU 111 of the image processing apparatus 100 receives the print job via the communication processing unit 401 and registers the print job to a print job queue held by the job processing unit 402. The job processing unit 402 sequentially reads jobs from the print job queue and drives the printer 124 to execute print processing.

FIG. 9 is a diagram schematically illustrating the print job queue. The jobs transmitted from the PC(2) 202 serving as the user terminal, or the like, are sequentially input to the print job queue. Each of the jobs includes information about a job ID 901, a job execution user ID 902, a job name 903, a reception date 904, and a status 905.

The job ID 901 is identification information for uniquely identifying the job and is added to the job at the time when the job is input to the print job queue.

The job execution user ID 902 is identification information for uniquely identifying the user who has input the job, and is included in the data received by the communication processing unit 401. More specifically, the job execution user ID 902 is added in step S605 of FIG. 6.

The job name 903 is a name of the job and is included in the job data received by the communication processing unit 401.

The reception date 904 is a date when the job has been input to the print job queue.

The status 905 indicates a current status of the job and indicates any of "under execution", "stand-by", and "suspended". "Under execution" indicates the job, the print processing of which is currently being executed. "Stand-by" indicates the job in stand-by for the print job execution. "Suspended" indicates the job, the print processing of which is suspended by the operation by the user described below. The image processing apparatus 100 changes the status of the job in the status of "under execution" or "stand-by" to "suspended" in response to the suspension instruction from the user. The job, the status of which is "suspended", is not executed until the user instructs resumption of the suspended job. Changing the status of the job from "under execution" to "suspended" indicates that the image formation is suspended until resumption of the suspended job is instructed. Changing the status of the job from "stand-by" to "suspended" indicates that even if the execution turn of the job comes, the image processing apparatus does not start execution of the job, and the execution of the job is started after resumption of the job is instructed.

The job processing unit 402 sequentially reads "stand-by" jobs from the print job queue, drives the printer 124 to start print processing, and at the same time, changes the status 905 of the job to "under execution". When printing of the job is completed, the job processing unit 402 deletes the job from the print job queue, and the job processing unit 402 repeats reading and print processing of the subsequent "stand-by" jobs.

<Authentication Processing in Image Processing Apparatus>

Figure 10:
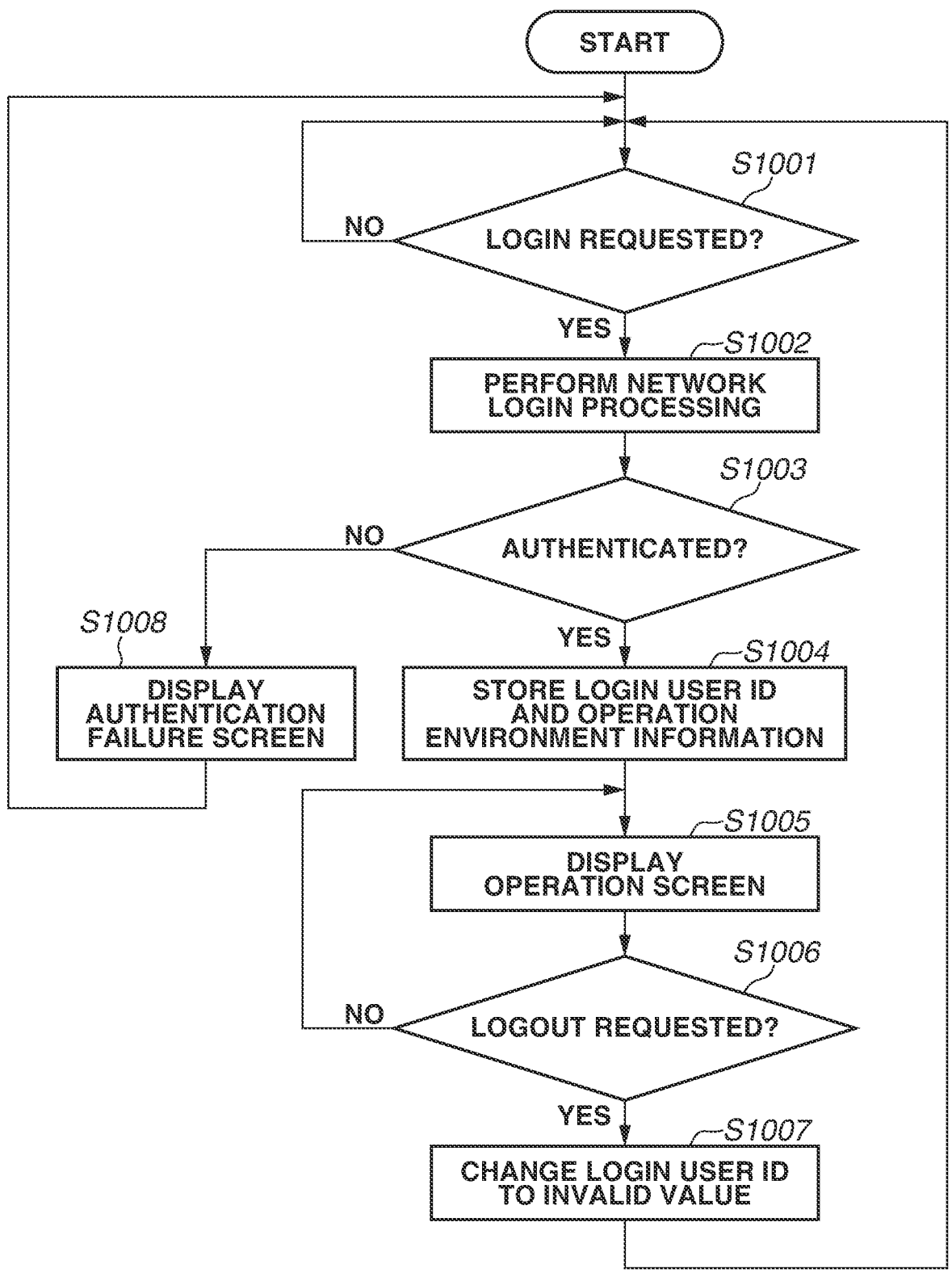
FIG. 10 is a flowchart illustrating a flow of login processing in the image processing apparatus.

Next, the authentication processing in the image processing apparatus 100 will be described with reference to the flowchart of FIG. 10. The authentication processing in the flowchart of FIG. 10 is processing executed when the CPU 111 causes the function units of the image processing apparatus 100 to function. In step S1001, the CPU 111 determines whether the login request has been issued. In a case where the request has not been issued, the processing waits. The login request is issued in such a manner that the login screen is displayed on the display 122 and the login user ID and the password are entered by the user using the hardware keys 121 and the touch panel 120.

Figure 11:
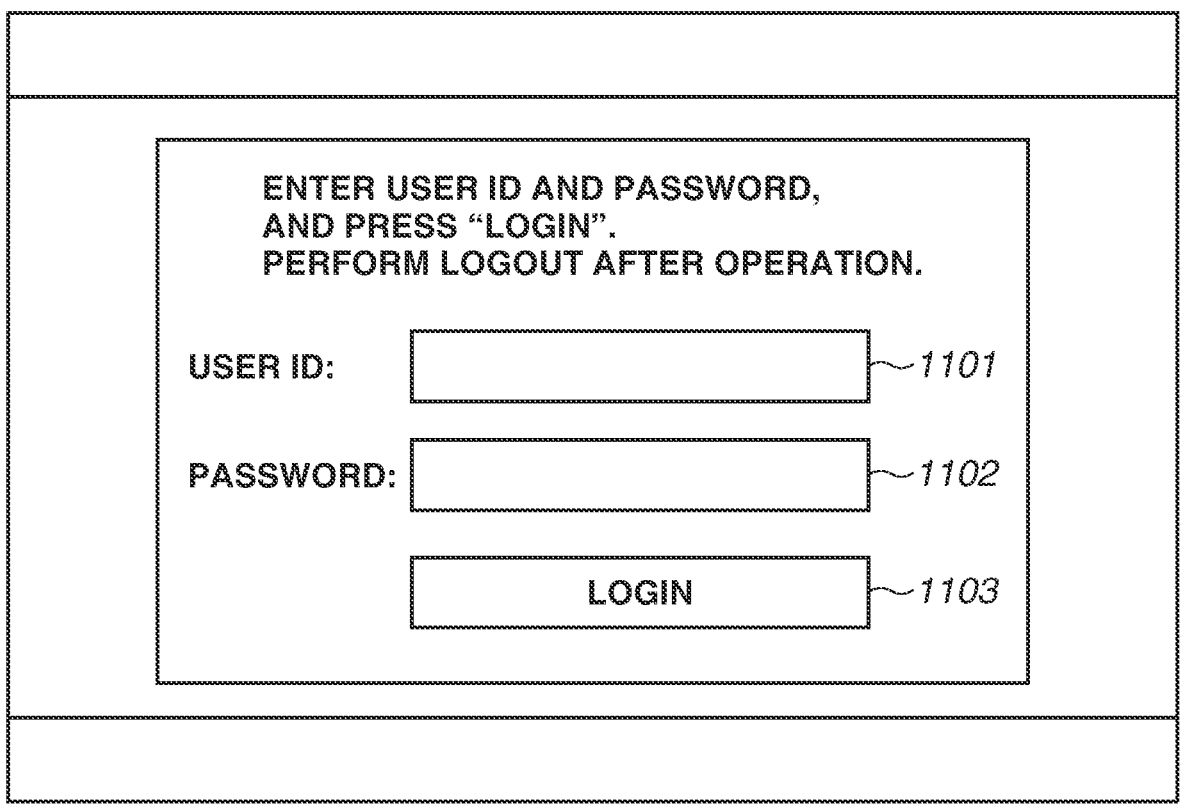
FIG. 11 illustrates an example of a login screen on the PC.

FIG. 11 illustrates an example of the login screen displayed on the display 122. The user enters the login user ID in a user name entry field 1101 and the password in a password entry field 1102, and the user then presses a "login" button 1103, thereby issuing the login request.

The login request may be issued in response to input from, for example, an IC card reader or a biometric authentication device using fingerprint authentication connected to the image processing apparatus 100, in addition to the above-described method. When it is determined in step S1001 that the login request has been issued, the processing proceeds to step S1002, and the CPU 111 performs the network login processing to log in to the PC(1) 201 serving as the user authentication server. More specifically, the user information entered using the touch panel 120 or the hardware keys 121 illustrated in FIG. 1 in the login request in step S1001 is transmitted by the CPU 111 to the PC(1) 201 serving as the user authentication server via the communication processing unit 401 illustrated in FIG. 4 and the communication I/F 306. Then, the CPU 111 obtains an authentication result from the PC(1) 201 serving as the user authentication server.

Figure 12:
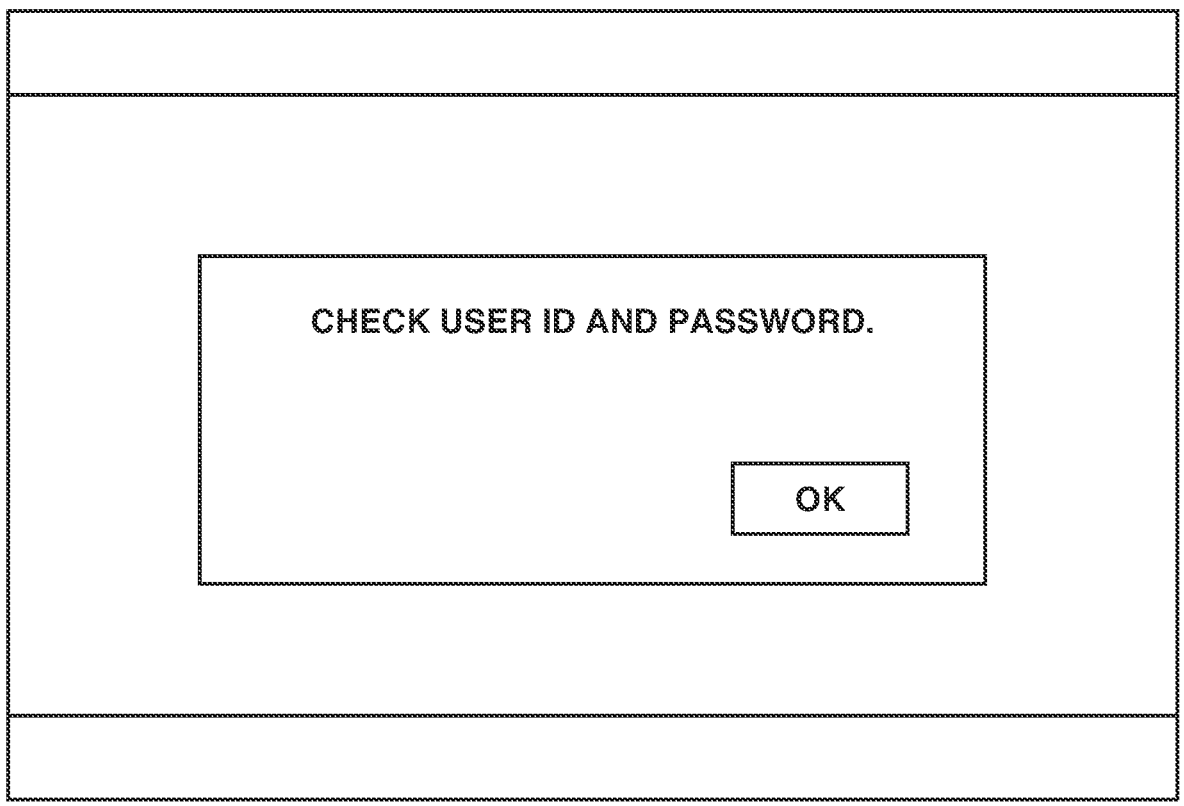
FIG. 12 illustrates an example of an authentication failure screen displayed on the display of the image processing apparatus.

In step S1003, the CPU 111 checks whether authentication has been obtained from the PC(1) 201 serving as the user authentication server. In a case where authentication has been obtained (YES in step S1003), the processing proceeds to step S1004. In a case where authentication has not been obtained (NO in step S1003), the processing proceeds to step S1008. In step S1008, the CPU 111 displays a screen indicating authentication failure on the display 122, and the processing returns to step S1001 and waits for the login request. FIG. 12 illustrates an example of an authentication failure screen displayed on the display 122 in step S1008.

In a case where authentication has been obtained, in step S1004 the CPU 111 stores, in the RAM 112, the login user ID and the operation environment information about the login user acquired from the PC(1) 201 serving as the user authentication server.

Subsequently, in step S1005, the CPU 111 displays an operation screen for the image processing apparatus 100 on the display 122.

Figure 13:
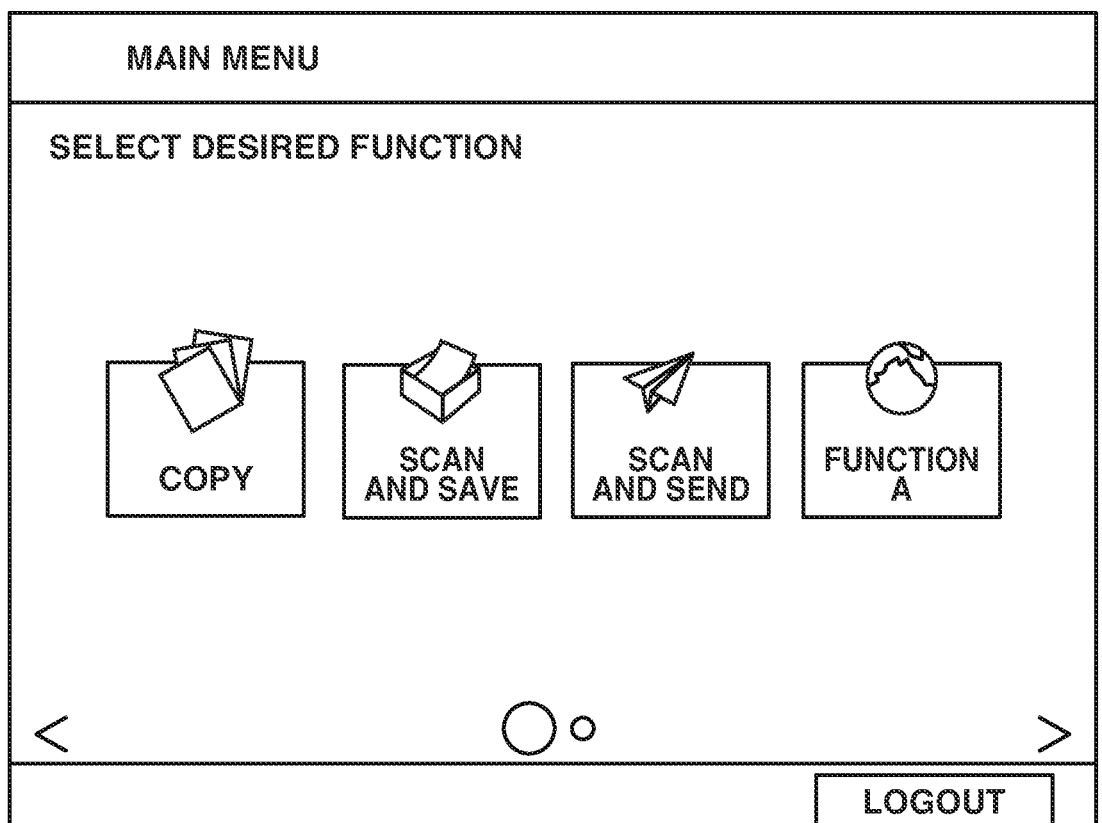
FIG. 13 illustrates an example of an operation screen of the image processing apparatus displayed on the display of the image processing apparatus.

FIG. 13 illustrates an example of the screen displayed on the display 122 in step S1005. The user can perform operations on the displayed operation screen to perform various kinds of operation of the image processing apparatus 100.

In step S1006, the CPU 111 determines whether the logout request has been issued. The logout request is issued in a case where a "logout" button 1301 in the operation screen displayed on the display 122 is pressed, or in a case where operation is not input by the user for a predetermined period of time. In a case where it is determined that the logout request has been issued (YES in step S1006), the CPU 111 discards the login user ID stored in step S1004, and stores an invalid value (value indicating the absence of a login user) in step S1007. The processing then returns to step S1001. The CPU 111 (authentication processing unit 404) of the image processing apparatus 100 constantly monitors, through the above-described processing, whether there is a user logged in to the image processing apparatus 100, and in a case where there is a user logged in to the image processing apparatus 100, the image processing apparatus 100 always has hold of the login user ID of the applicable user.

<Suspension Processing>

Figure 14:
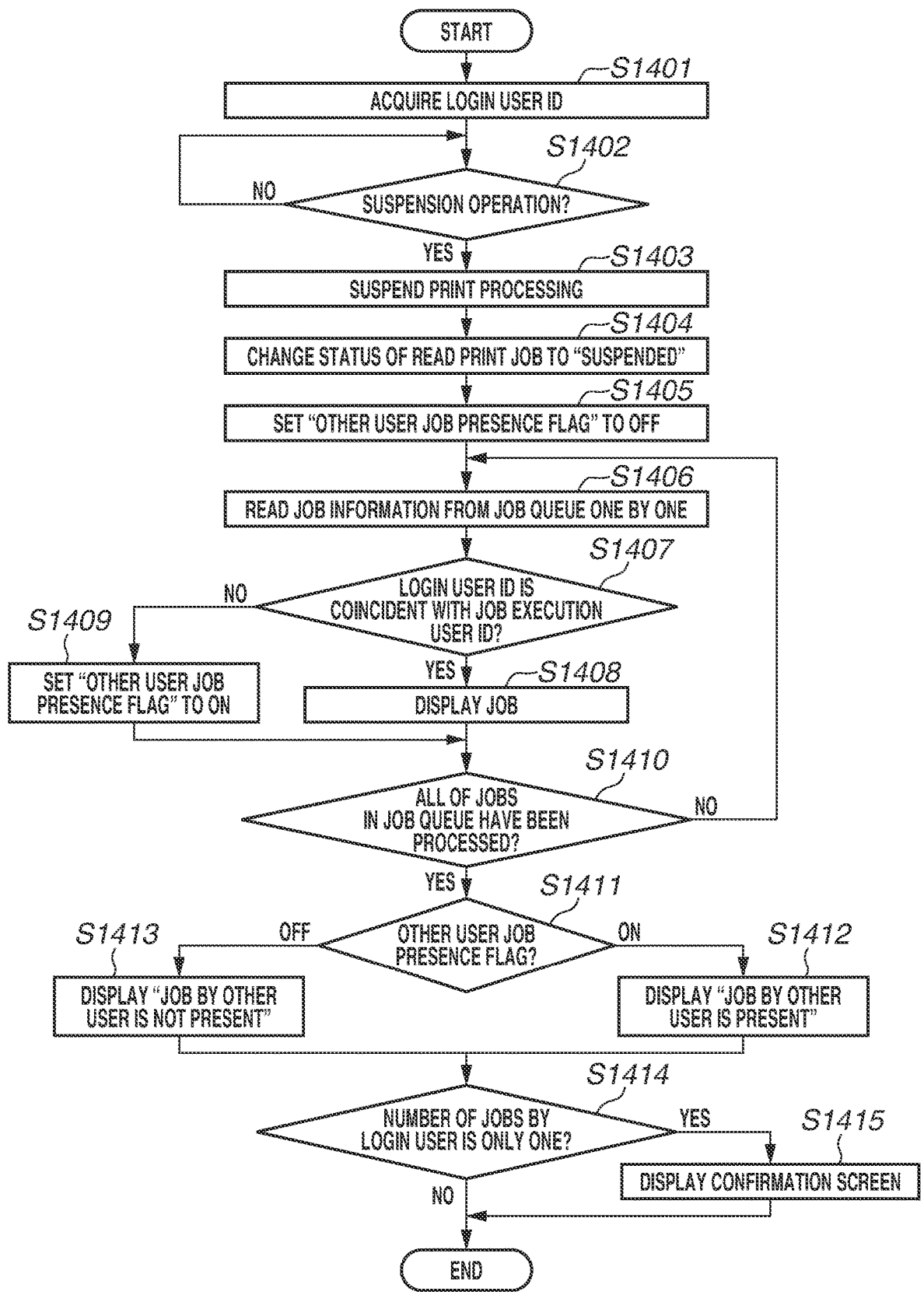
FIG. 14 is a flowchart illustrating a flow of job suspension processing in the image processing apparatus.

Next, the print suspension processing in the image processing apparatus 100 will be described with reference to the flowchart of FIG. 14. The print suspension processing in the flowchart of FIG. 14 is realized when the CPU 111 executes processing of the function units of the image processing apparatus 100. In step S1401, the CPU 111 acquires the login user ID of the login user. The login user ID is stored in step S1004 in the flowchart of FIG. 10. In step S1402, the CPU 111 determines whether the user has performed the job suspension operation. More specifically, the CPU 111 determines whether the stop key, which is provided as one of the hardware keys 121, has been pressed. Also, a stop button may be provided as a software key in the operation screen displayed on the display 122, and the CPU 111 may determine whether the stop button has been pressed. In a case where it is determined that the suspension operation has been performed (YES in step S1402), the processing proceeds to step S1403.

In step S1403, the CPU 111 suspends print processing for all of "under execution" jobs and "stand-by" jobs in the print job queue. More specifically, the CPU 111 performs discharge processing of a sheet that has been already fed into the image processing apparatus 100 in order to prevent the sheet from remaining in the image processing apparatus 100, and performs control so that a new sheet is not fed.

Subsequently, in step S1404, the status of the read print job is changed to "suspended".

Subsequently, in step S1405, the CPU 111 initializes information about whether a job by another user is included in the suspended jobs when the login user executes the suspension processing and stores the information in the memory 302 or the auxiliary storage device 303. In this example, the CPU initializes the information to a state where "job by other user is not included" and stores the information. In this example, the information is handled as "other user job presence flag", and the flag is set to OFF and stored. A format of contents to be stored is not particularly limited.

Subsequently, in step S1406, the CPU 111 reads the job information from the print job queue one by one. In step S1407, the CPU 111 determines whether the login user ID is coincident with the job execution user ID 902 of the job read from the print job queue. For example, in a case where the login user ID of the user logged in to the image processing apparatus 100 is "user_00", the job execution user ID 902 of "user_00" of the job in the print job queue is determined to be coincident. In a case where it is determined to be coincident (YES in step S1407), the processing proceeds to step S1408. In a case where it is determined to be not coincident (NO in step S1407), the processing proceeds to step S1409. In step S1408, the jobs in which the login user ID and the job execution user ID 902 have been coincident with each other in step S1407 are displayed on the job list screen, and the processing then proceeds to step S1410.

In contrast, in step S1409, the CPU 111 rewrites the "other user job presence flag" set in step S1405 to ON and stores the flag. The processing then proceeds to step S1410.

In step S1410, the CPU 111 determines whether all of the jobs in the print job queue have been processed. When the CPU 111 determines that an unprocessed job is present (NO in step S1410), the processing returns to step S1406, and the CPU 111 reads the next job information from the print job queue and repeats the processing in and after step S1407. In contrast, when the CPU 111 determines that all of the jobs have been processed (YES in step S1410), the processing proceeds to step S1411. In step S1411, the "other user job presence flag" stored in the memory 302 or the auxiliary storage device 303 is read. In a case where the job by the other user is included ("other user job presence flag" is ON in step S1411), a message "job by other user is present" is displayed in another user job presence/absence determination display region 1505 in step S1412.

In a case where it is determined in step S1411 that the job by the other user is not included ("other user job presence flag" is OFF in step S1411), a message "job by other user is not present" is displayed in the other user job presence/absence determination display region 1505 in step S1413. Next, in step S1414, the CPU 111 determines whether the number of jobs in which the login user ID and the job execution user ID 902 are coincident with each other is only one. In a case where the number of jobs is one (YES in step S1414), it is presumed that the user wants to cancel the job. Therefore, the processing proceeds to step S1415, and a confirmation screen is displayed. In a case where the number of jobs in which the login user ID and the job execution user ID 902 are coincident with each other is not one in step S1414 (NO in step S1414), the processing ends.

Figure 15:
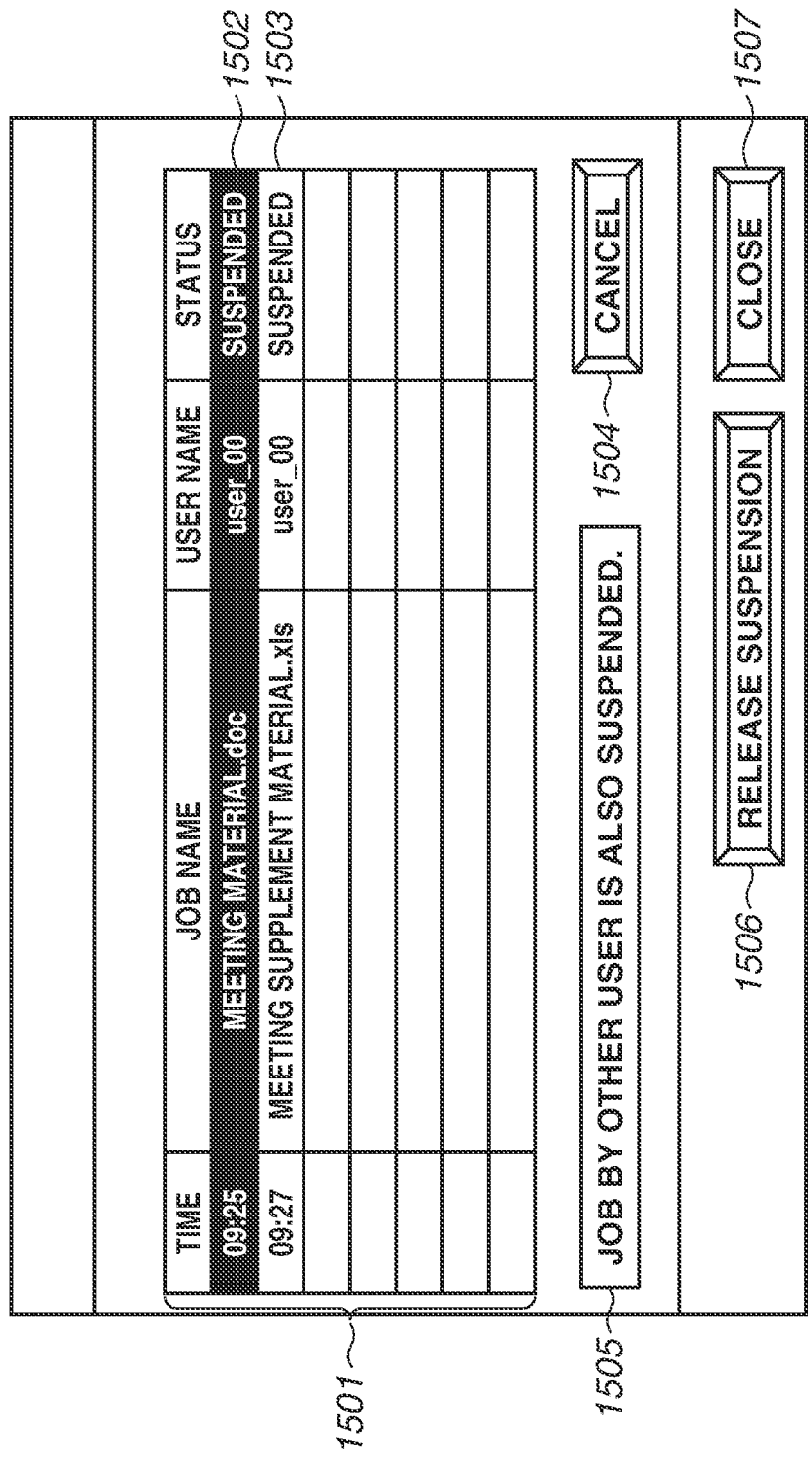
FIG. 15 illustrates an example of a print suspension screen displayed on the display of the image processing apparatus.
Figure 16:
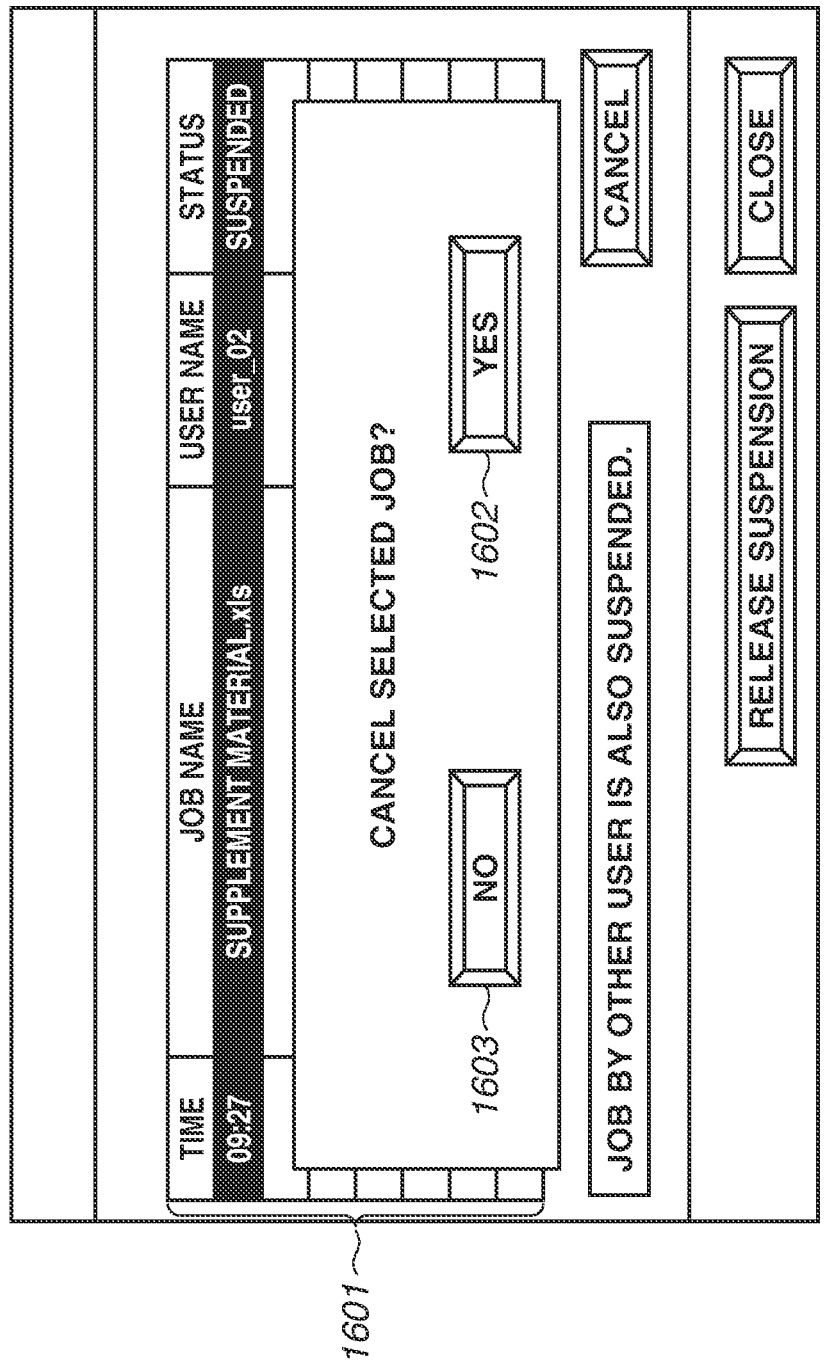
FIG. 16 illustrates an example of the print suspension screen displayed on the display of the image processing apparatus.

FIG. 15 illustrates an example of the job list screen displayed on the display 122 in step S1408. In a print job list 1501, a time when each job has been received, a job name of the input job, the user name showing the job execution user ID, and a job execution status are displayed based on the contents of the print job queue. The screen example corresponds to a case where the user having the job execution user ID 902 of "user_00" inputs the print job, and the user having the login user ID of "user_00" then logs in to the image processing apparatus 100 and performs the print suspension processing. Only the jobs (1502 and 1503) corresponding to the user name of "user_00" are displayed in the print job list 1501. Each row in the print job list 1501 is selectable, and the selected row is highlighted. In this example, the job 1502 has been selected. A button 1504 is a cancel button. In a case where the button 1504 is pressed while the job is selected, a cancel confirmation screen as illustrated in FIG. 16 is displayed. In a case where a "YES" button 1602 is selected, the CPU 111 cancels the selected job. More specifically, the CPU 111 deletes the job from the print job queue. In a case where a "NO" button 1603 is selected, the confirmation screen is closed and the screen is returned to the original screen (FIG. 15).

The other user job presence/absence determination display region 1505 is a region indicating whether a job by a user other than the login user is included in the suspended jobs when the login user performs the suspension. The print processing for all of "under execution" jobs in the print job queue is suspended; however, only the print jobs of the job execution user ID 902 coincident with the login user ID are displayed in the list. Displaying information about whether the job by the other user is suspended enables the user to easily recognize whether the suspension operation influences the other user. When a suspension release button 1506 is pressed, the CPU 111 releases suspension of the suspended jobs (jobs 1502 and 1503 in screen example) and changes the status of the jobs to under execution or stand-by. A close button 1507 is a button to close the screen.

FIG. 16 illustrates an example of the screen displayed on the display 122 in step S1415. The screen example corresponds to a case where the user having the job execution user ID 902 of "user_02" has input the print job, and the user having the login user ID of "user_02" has logged in to the image processing apparatus 100 and has performed the print suspension operation. Since there is only one job by the job execution user ID 902 of "user_02" in the print job queue, only one job is displayed in a print job list 1601. Further, the confirmation screen to confirm cancel is displayed. When the "YES" button 1602 is pressed, the CPU 111 cancels the selected job. More specifically, the CPU 111 deletes the job from the print job queue. When the "NO" button 1603 is selected, the confirmation screen is closed and the screen is returned to the original screen.

In a case where the CPU 111 determines that the job in the print job queue stored in the job processing unit 402 has been updated (e.g., in case where other user inputs print job from PC(2) 202 serving as user terminal), this screen is refreshed. The other user job presence/absence determination display region 1505 is also refreshed based on a new job in the print job queue by refreshing of the screen. As a result, even in a case where the job by the other user is not suspended at the beginning and the job is input by the other user and the input job is suspended, the information is rewritten and displayed.

In the present exemplary embodiment, the print job in which an image is printed based on the image data received from the PC is suspended when the stop key is pressed; however, the jobs relating to the plurality of functions using the printer 124 may also be suspended. For example, a copy job may be suspended in addition to the print job.

As described above, in the image processing apparatus according to the present exemplary embodiment, all of the print jobs are suspended when the user requests the job suspension. Only the jobs by the user who has requested the job suspension (e.g., jobs by a job execution user ID coincident with a login user ID) are displayed in the suspended print job list, which makes it easier for the login user to find a job to be canceled. In addition, since the job by the other user is not displayed in the list, it is possible to prevent the user from erroneously canceling the job by the other user.

Further, in the present exemplary embodiment, the other user job presence/absence determination information indicating whether the job by the other user has been suspended is displayed. Accordingly, an effect can be expected that, in a case where a job by the other user is present, the information provides an index for the user to quickly perform the operation in order to prevent decrease in productivity.

In the first exemplary embodiment, the display of the print job list in a case where the stop key is pressed (print suspension operation is performed) has been described. In a second exemplary embodiment, a case where job types other than the print job are displayed is described. The second exemplary embodiment will be described while focusing on the differences with the first exemplary embodiment.

The communication I/F controller 117 of the image processing apparatus 100 can perform sending/receiving of digital data (e.g., e-mail sending and server message block (SMB) sending) via the network. The user may sometimes erroneously input a send job to a wrong destination while the main menu illustrated in FIG. 13 is displayed in the image processing apparatus 100. In this case, the user presses the stop key that is provided as one of the hardware keys 121. The send job, etc., however, cannot be suspended even if the job suspension is instructed by the user.

Accordingly, in the second exemplary embodiment, such a job is preferentially displayed in the job list to enable the user to quickly perform the cancel processing.

Figure 17:
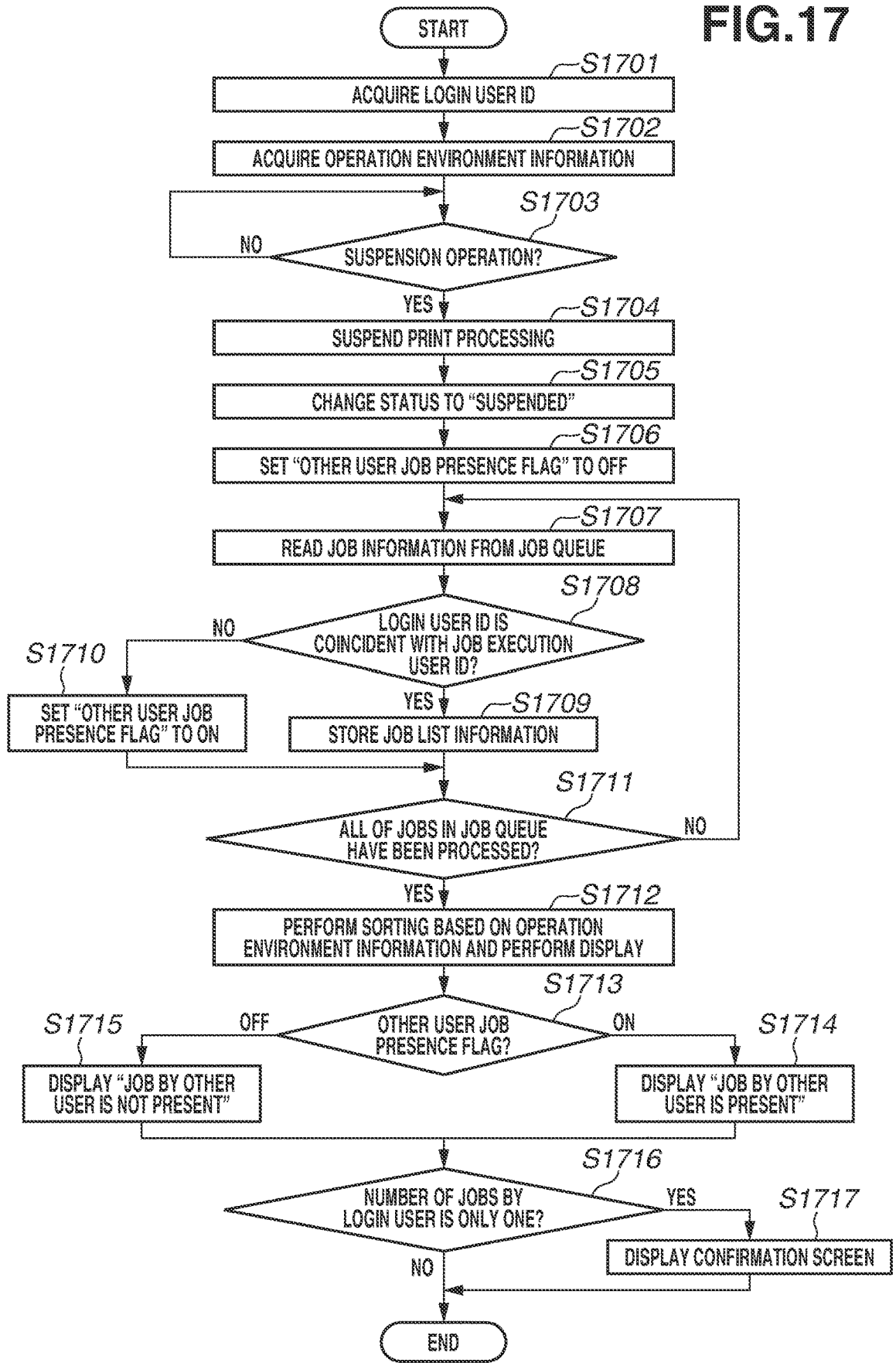
FIG. 17 is a flowchart illustrating a flow of the job suspension processing in the image processing apparatus.

The second exemplary embodiment will be described with reference to a flowchart of FIG. 17. The job suspension processing in the flowchart of FIG. 17 is realized when the CPU 111 executes processing of the function units of the image processing apparatus 100. In step S1701, the CPU 111 acquires the login user ID of the login user. The login user ID is stored in step S1004 in the flowchart of FIG. 10. In step S1702, the CPU 111 further acquires the operation environment information about the login user. The user operation environment information is stored in step S1004 in the flowchart of FIG. 10.

In the present exemplary embodiment, the user operation environment information indicates priority of the jobs displayed in the job list. More specifically, the priority of the jobs illustrated in FIG. 18 is acquired. In step S1703, the CPU 111 determines whether the user has performed the job suspension operation. More specifically, the CPU 111 determines whether the stop key that is provided as one of the hardware keys 121 has been pressed. Alternatively, a stop button may be provided as a software key in the operation screen displayed on the display 122, and the CPU 111 may determine whether the stop button has been pressed. In a case where it is determined that the suspension operation has been performed (YES in step S1703), the processing proceeds to step S1704.

In step S1704, the CPU 111 suspends print processing for all "under execution" jobs and "stand-by" jobs in the print job queue. More specifically, the CPU 111 performs discharge processing of a sheet that has been already fed into the image processing apparatus 100 in order to prevent the sheet from remaining in the image processing apparatus 100, and performs control so that a new sheet is not fed.

Subsequently, in step S1705, the status of the read job is changed to "suspended".

In subsequent step S1706, the CPU 111 stores, in the memory 302 or the auxiliary storage device 303, information about whether the job by another user is included in the suspended jobs when the login user executes the suspension processing. In this example, the CPU 111 stores the information indicating that "job by other user is not included" (e.g., "other user job presence flag" is set to OFF). In this example, a format of contents to be stored is not particularly limited.

Subsequently, in step S1707, the CPU 111 reads the job information from all of the job queues, including the print job queue, one by one. In step S1708, the CPU 111 determines whether the login user ID is coincident with the job execution user ID 902 of the job read from the print job queue. For example, in a case where the login user ID is "user_00", the job execution user ID 902 of "user_00" of the job in the print job queue is determined to be coincident. In a case where it is determined to be coincident (YES in step S1708), the processing proceeds to step S1709. In a case where it is determined to be not coincident (NO in step S1708), the processing proceeds to step S1710.

In step S1709, the list information of the jobs in which the login user and the job execution user ID 902 have been determined to be coincident with each other in step S1708 is temporarily stored in the memory 302 or the auxiliary storage device 303.

In contrast, in step S1710, the CPU 111 rewrites the "other user job presence flag" set in step S1706 to ON and stores the flag.

Next, in step S1711, the CPU 111 determines whether the processing has been performed on the jobs of all job types, including the print job queue. When the CPU 111 determines that an unprocessed job is present (NO in step S1711), the processing returns to step S1707, and the CPU 111 reads the next job information from the job queue. When the CPU 111 determines that all of the jobs have been processed (YES in step S1711), the processing proceeds to step S1712. In step S1712, the jobs in the job list of the login user stored in the memory 302 or the auxiliary storage device 303 are sorted based on the priority of the jobs acquired in step S1702, and the sorted jobs are displayed.

Figure 19:
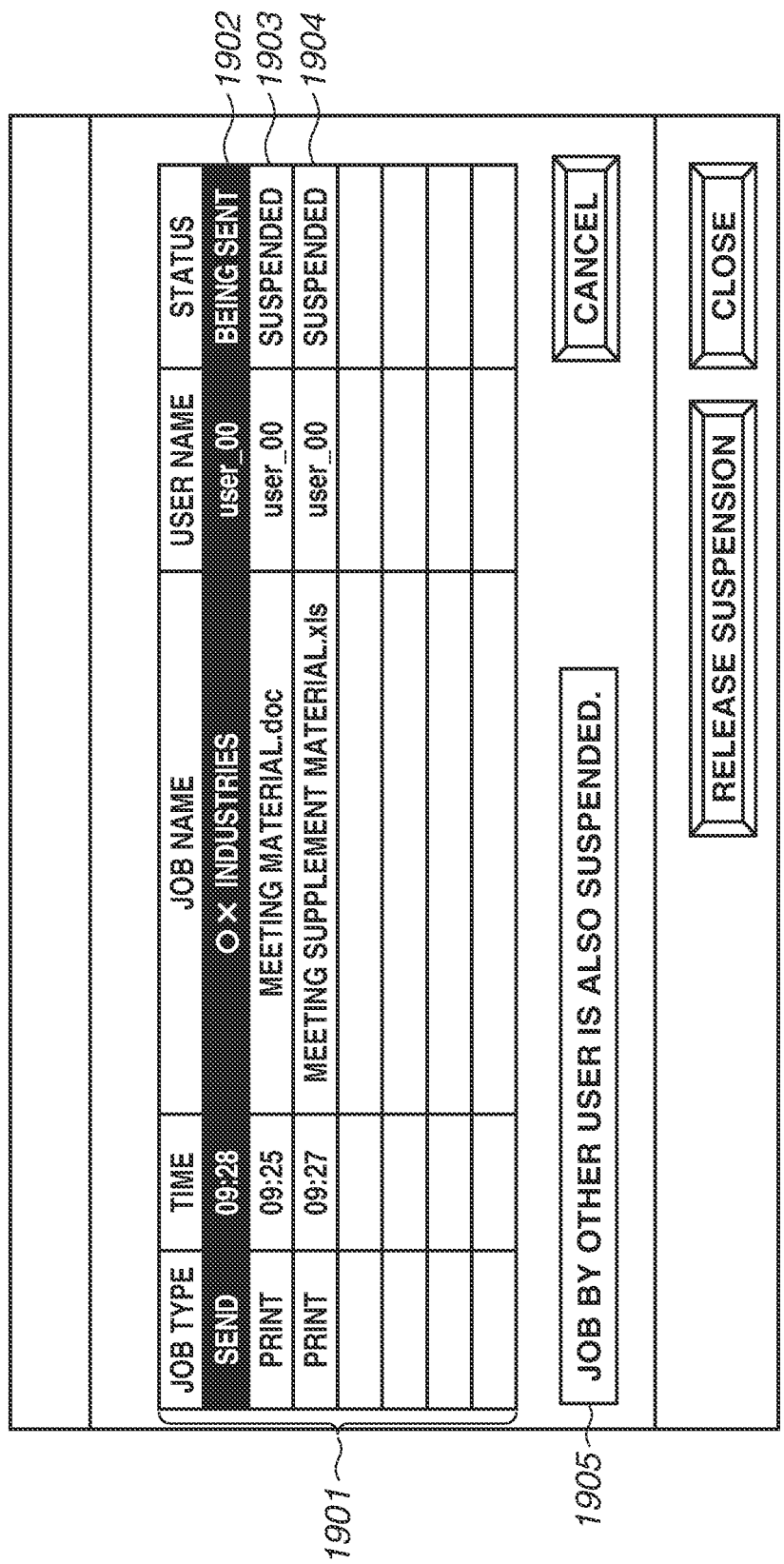
FIG. 19 illustrates an example of a job list screen displayed on the display of the image processing apparatus.

FIG. 19 illustrates a job list screen in which the list of jobs sorted based on the job priority is displayed. A job 1902 is a send job and is being sent. Jobs 1903 and 1904 are print jobs and are suspended. The priority of the send job that cannot be suspended is set to high, and the send job is put into the selected state, which allows for quick cancel processing. In the present exemplary embodiment, the case where the priority of the send job is high has been described; however, the priority may be optionally changed for each user.

Next, in step S1713, the information indicating whether the job by the other user is included is read from the memory 302 or the auxiliary storage device 303. In a case where the job by the other user is included (in present exemplary embodiment, the "other user job presence flag" is ON in step S1713), a message "job by other user is present" is displayed in another user job presence/absence determination display region 1905 in step S1714.

In a case where it is determined in step S1713 that the job by the other user is not included (the "other user job presence flag" is OFF in step S1713), a message "job by other user is not present" is displayed in the other user job presence/absence determination display region 1905 in step S1715.

Next, in step S1716, the CPU 111 determines whether the number of jobs by the login user is only one. In a case where the number of jobs is one (YES in step S1716), it is presumed that the user wants to cancel the job. Therefore, a confirmation screen is displayed in step S1717, and the processing then ends. In a case where the number of jobs is not one (NO in step S1716), the processing ends.

As described above, in the image processing apparatus according to the present exemplary embodiment, all of the jobs by the login user are sorted based on the predetermined priority in such a manner that the job that cannot be suspended is preferentially displayed. Further, the jobs in the list can be sorted in an order desired by the user. This makes it possible to further enhance legibility and to improve operability associated with the job cancel operation.

Other Exemplary Embodiments

In the above-described exemplary embodiments, the case where the user presses the stop key to suspend the print job received from the external information processing apparatus, such as the PC, has been described. The similar processing may be applied to a copy function in which the scanner 125 scans a document and the printer 124 forms an image. For example, in a case where the user logs in to the image processing apparatus and presses the stop key, the image processing apparatus suspends the print job and the copy job executed by the login user. At this time, the image processing apparatus displays only the jobs, the execution of which has been instructed by the login user, in a list. This enables the login user to easily find his/her own job from the job list screen displayed when the user presses the stop key.

As described above, according to the above-described exemplary embodiments, in a case where the job suspension request is issued to cancel the job, only the job by the user who has requested the job suspension is displayed in the suspended job list. This makes it possible to enhance legibility and to prevent the user from erroneously canceling the job by the other user.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2018-017493, which was filed on Feb. 2, 2018 and which is hereby incorporated by reference herein in its entirety.

What is claimed is:

1. An image processing apparatus, comprising:
a printer configured to print an image on a sheet;
a display device;
at least one processor; and
at least one non-transitory memory in communication with the at bast one processor and storing instructions that, when executed by the at least one processor, cause the image processing apparatus to:
store a job and identification information of a user who input the job in association with each other in the at least one non-transitory memory;
suspend a plurality of jobs, including a job of a user who is not logged in to the image processing apparatus, in response to a suspension operation by a user who is logged in to the image processing apparatus;
in a case where the user who is logged in to the image processing apparatus performs the suspension operation and a job list screen that includes a list of jobs is displayed, display the job list screen that does not include the job that was input by the user who is not logged in to the image processing apparatus and includes the job that was input by the user who is logged in to the image processing apparatus; and
cancel a job selected in the job list screen.

2. The image processing apparatus according to claim 1, wherein jobs are sorted based on a priority set for each job type.

3. The image processing apparatus according to claim 1, wherein, in a case where a number of jobs that are stored in association with the user who is logged in to the image processing apparatus is one, the job list screen displays the job in a selected state.

4. The image processing apparatus according to claim 1, wherein the instructions, when executed by the at least one processor, further cause the image processing apparatus to prompt a user to confirm whether to cancel the selected job in the job list screen.

5. The image processing apparatus according to claim 1, wherein the suspension operation is performed by pressing of a stop key or a stop button displayed on an operation screen.

6. The image processing apparatus according to claim 1, wherein the instructions, when executed by the at least one processor, further cause the image processing apparatus to:
receive image data from an external apparatus; and
suspend a print job in which an image is printed on a sheet based on the received image data.

7. The image processing apparatus according to claim 1, further comprising a scanner configured to read a document to generate image data,
wherein the instructions, when executed by the at least one processor, further cause the image processing apparatus to, in response to the suspension operation by the user who is logged in to the image processing apparatus, suspend a copy job in which an image is printed on a sheet based on the image data obtained through reading of the document by the scanner.

8. The image processing apparatus according to claim 1, wherein the instructions, when executed by the at least one processor, further cause the image processing apparatus to, in response to the suspension operation by the user who is logged in to the image processing apparatus, cause the display device to display a notification that indicates that the job of the user who is not logged in to the image processing apparatus is present.

9. The image processing apparatus according to claim 1, wherein the instructions, when a executed by the at least one processor, further cause the menage processing apparatus to suspend a job for which image formation is being executed by the printer, in response to the suspension operation by the user who is logged in to the image processing apparatus, only in a case where the user who is logged in to the image processing apparatus is the user who input the job for which image formation is being executed by the printer.

10. The image processing apparatus according to claim 1, wherein the instructions, when executed by the at least one processor, further cause the image processing apparatus to acquire user identification information for the user who is logged in to the image processing apparatus before the suspension operation by the user who is logged in to the image processing apparatus in an operation that is separate from the suspension operation.

11. A method for controlling an image processing apparatus that includes at least one non-transitory memory and a printer, the at least one non-transitory memory being configured to store a job and identification information of a user who input the job in association with each other, and the printer being configured to print an image on a sheet, the method comprising:

storing one or more jobs and respective identification information of users who input the one or more jobs in the at least one non-transitory memory in association with each other;

suspending a plurality of jobs, including a job that was input by a user who is not logged in to the image processing apparatus, in response to a suspension operation by a user who is logged in to the image processing apparatus;

in a case where the user who is logged in to the image processing apparatus instructs the suspension operation, displaying a job list screen, wherein the job list screen does not include the job that was input by the user who is not logged in to the image processing apparatus, and wherein the job list screen includes the job that was input by the user who is logged in to the image processing apparatus; and canceling a job selected in the job list screen.

12. One or more non-transitory storage media storing instructions that, when executed by one or more image processing apparatuses, cause the one or more image processing apparatuses to perform operations comprising:

storing, in at least one non-transitory memory, one or more jobs and respective identification information of users who input the one or more jobs in association with each other;
and in response to a suspension operation by a user who is logged in to the one or more image processing apparatuses,
suspending a plurality of jobs including a job that was input by a user who is not logged in to the one or more image processing apparatuses, and
displaying a job list screen that includes a job that was input by the user who is logged in to the one or more image processing apparatuses and that does not include the job that was input by the user who is not logged in to the one or more image processing apparatuses.

* * * * *